United States Patent [19]
Blair et al.

[11] Patent Number: 5,600,640
[45] Date of Patent: Feb. 4, 1997

[54] CALL PROCESSING SYSTEM FOR CONTROLLING CONNECTIONS IN A COMMUNICATIONS SYSTEM

[75] Inventors: Hamish M. Blair; Graham R. Dent, both of Kenilworth; John W. Cutler, Coventry, all of Great Britain; Cornelis Hoogendoorn, Graefelfing; Heinrich Schiessl, Munich, both of Germany; Larry E. Schessel, Boca Raton, Fla.

[73] Assignees: Siemens Aktiengesellschaft, Munich, Germany; GPT Ltd., Coventry, Great Britain

[21] Appl. No.: 392,727

[22] PCT Filed: Aug. 25, 1993

[86] PCT No.: PCT/EP93/02287

§ 371 Date: Jun. 7, 1995

§ 102(e) Date: Jun. 7, 1995

[87] PCT Pub. No.: WO94/05121

PCT Pub. Date: Mar. 3, 1994

[30] Foreign Application Priority Data

Aug. 25, 1992 [EP] European Pat. Off. ............. 92114476

[51] Int. Cl.$^6$ ................................................. H04Q 11/04
[52] U.S. Cl. ...................... 370/360; 370/384; 370/399
[58] Field of Search .......................... 370/54, 58.1, 58.2, 370/58.3, 60, 60.1, 68.1, 94.1, 94.2, 110.1; 340/825.03, 825, 827; 379/268, 269, 271, 272, 273, 157, 165

[56] References Cited

U.S. PATENT DOCUMENTS

| | | | |
|---|---|---|---|
| 4,821,256 | 4/1989 | Schmidt et al. | 370/58.2 |
| 4,903,258 | 2/1990 | Kuhlmann et al. | 370/58.2 |
| 5,051,982 | 9/1991 | Brown et al. | 370/58.2 |
| 5,390,171 | 2/1995 | Storm | 370/58.2 |
| 5,434,852 | 7/1995 | La Porta et al. | 370/58.2 |

OTHER PUBLICATIONS

International Switching Symposium, vol. 2, Jun. 1990, E. C. Arnold et al, "Object Oriented Software Technologies Applied to Switching System Architectures and Software Development Processes", pp. 97–106.

IEEE Network: The Magazine of Computer Communications, vol. 4, No. 6, Nov. 1990, J. S. Stacey et al, "Modeling Call Control for Distributed Applications in Telephony", pp. 14–22.

European Transactions on Telecommunications and Related Technologies, vol. 2, No. 4, Aug. 1991, G. P. Balboni et al, "An ATM Switching Testbed", pp. 391–401.

Proceedings of the National Communications Forum, vol. 45, Oct. 1991, S. Cannon, "Switch Architecture for the Intelligent Network", pp. 185–193.

*Primary Examiner*—Alpus H. Hsu
*Attorney, Agent, or Firm*—Hill, Steadman & Simpson

[57] ABSTRACT

In the development of development systems, efforts are being made to design software systems which are as modular as possible for controlling the switching system. Efforts are also being made to achieve this aim for the call processing system for controlling connections in a switching system. The basic structure of the call processing system has a signaling interface system and a call control system, both of which are limited to logic connection control and submit autonomous connection requests to a resource control system which carries out the physical connection control. The call processing system furthermore has a coordination system for coordinating the autonomous connection requests with respect to the resource control system.

9 Claims, 3 Drawing Sheets

CALL PROCESSING SYSTEM FOR CONTROLLING CONNECTIONS IN A COMMUNICATIONS SYSTEM

BACKGROUND OF THE INVENTION

In the development of development systems, efforts are being made to design software systems which are as modular as possible for controlling the switching system. This is being done primarily with respect to improved decoupling of the individual functions of a switching system and thus a simpler subsequent modification capability as well as improved reusability of the switching software in further developments.

Switching application software which is divided into a plurality of components is known from the article "Object Oriented Software Technologies Applied to Switching Architectures and Software Development Processes" by E. C. Arnold et al from the "International Switching Symposium 1990, Volume 2, June 1990, Stockholm SE, pages 97–106". The components in this case represent logic and physical system entities. For example, the component "call" represents the system entity "call". The component "call" in this case controls the system entity "call" both at the logic level and at the physical level (with the exception of the local physical connection control which is carried out by the local components of the "fabric" type).

SUMMARY OF THE INVENTION

The invention is based on the object of specifying a modular call processing system.

This object is achieved by a call processing system for controlling connections in a switching system, having the following features: a signaling interface system which forms the interface of the call processing system to the signaling type on which the respective connection ends are based, and carries out that part of the logic connection control which is dependent on the type of signaling; a call control system which carries out that part of the logic connection control which is independent of the type of signaling; initialization of connection control processes at the physical level by corresponding connection requests to a resource control system, which connection requests are produced by the signaling interface system and the call control system in a mutually independent manner; and a coordination system which coordinates the mutually independent connection requests submitted to the resource control system by the signaling interface system and the call control system.

The call processing system according to the invention is limited to logic connection control and initialization of physical connection control processors, while the resource control system carries out the physical connection control processes. In consequence, the call processing system is independent of the physical connection control.

The independence of the call control system from different signaling variants is ensured by breaking the call processing system down into a signaling interface system and a call control system.

The independence between the signaling interface system and the call control system is assisted by the coordination system, since these systems can now formulate autonomous connection requests, that is to say connection requests which are independent of one another. Otherwise, the resource control system is relieved of coordination tasks by the coordination system. However, this relief means that the resource control system now need not have any knowledge of the modular dependencies of the call processing system. In consequence, the resource control system can be designed as a general service system for controlling connections at the physical level and can also make its service available to other user systems in addition to the call processing system, such as to a processing system for system administration or to a processing system for signaling administration, for example.

A further embodiment of the invention is characterized in that the call control system and the signaling interface system comprise a transient system having a plurality of transient modules. The transient modules dynamically produce in each case one chain of entities per connection, which entities communicate with one another by means of an information interface which is common to all the transient modules. An entity in each case autonomously carries out a sub task of the logic connection control and in so doing, is able to submit corresponding autonomous connection requests to the resource control system, via the coordination system. The modularization of the call processing system is further refined by this embodiment. The information interface which is common to all the entities of a chain allows new features to be added or existing features to be modified, in that a feature entity is easily inserted into the chain or modified, without this having any influence on the other entities of the chain.

A further embodiment of the invention is characterized in that stimulation information which causes user actions is in each case initially received by the entities at the ends of a chain and, after carrying out a sub task corresponding to the entity, can be passed on along the chain. The position of an entity in the chain is defined by the function of its transient module. In this embodiment, every sub function of the logic connection control, represented by an entity, has its specific position within the chain. Since stimulation information initially now enters the chain at its ends and is then passed on from entity to entity, a sequence automatically results in accordance with which the entities of a chain process a connection control procedure. Many problems relating to feature interaction are solved by this sequence. Conventional call processing systems must check whenever they receive a new stimulation information item whether this information item influences instantaneously existing call features, and must react appropriately as a function thereof. The call processing system according to the invention solves this problem by the position of a feature entity within the chain. Every entity of the chain thus acts on the assumption, on receipt of a stimulation information item, that there are no interacting feature instances having higher priority in the chain, and acts accordingly irrespective of the presence of such a feature entity. Independence of the transient modules is in consequence required, without the problem of coordination of the independent connection requests of the instances to the resource control system and thus the complexity of the coordination system in consequence being increased excessively.

A further embodiment of the invention is characterized in that the call control system additionally comprises a static system having a plurality of steady-state modules, a steady-state module receiving commands from the produced entities of a transient module and then carrying out that part of the control task of a transient module which is dependent on the structure of the data base. In this embodiment, the steady-state modules of the static system represent a neutral interface between the transient modules of the transient system and the semi-permanent data base. This neutral interface conceals the physical structure of the data base from the transient system which represents the central general part of the call processing system. The transient system thus no longer needs to distinguish between different types of logic user identifiers (for example POTS, CENTREX etc) or different types of logic access identifiers (for example analog, N-ISDN, B-ISDN etc).

A further embodiment of the invention is characterized in that the coordination system comprises coordination modules. The coordination modules receive and buffer store connection requests produced for an active connection end point involved with a connection, pass onto the resource control system a connection request buffer stored by them when they have received control over an active connection end point, and give up control over a specific active connection end point between one another in such a manner that only one coordination module has control over this active connection end point at a specific point in time. This embodiment exhibits a special distributed coordination system which, by allocating a control mark among the coordination modules, ensures that only one connection request is passed on to the resource control system from a specific call, and is carried out, at a specific point in time. This ensures that the resource control system never simultaneously receives or carries out a plurality of connection requests simultaneously for a specific call and therefore need not consider dependencies between connection requests.

A further embodiment of the invention is a switching system having a call processing system and having a resource control system having a switching control system and resource systems. The switching control system controls the connections at the physical level in a central manner and for this purpose receives connection requests from the call processing system, while the resources systems of the switching system control the respective resources locally and for this purpose receive commands from the switching control system. The introduction of the switching control system as a central physical subsystem of the resource control system ensures in the case of this embodiment of the invention that the coordination system, and thus the call processing system, are completely independent of the hardware architecture of the resources (for example switching networks). Furthermore, in addition to the call processing system, the central physical switching control system can also serve other user systems, as a universal service system for central control of connections at the physical level.

A further embodiment of the invention is characterized in that the switching control system processes, independently of one another, the connection requests received from the call processing system. In the case of first connection requests, the switching control system sets up a path envelope which includes data describing the switched path. The switching control system transfers the said path envelope to the coordination system after carrying out the connection request. The coordination system stores the path envelope and also passes it to the switching control system in the case of a later connection request. This embodiment enhances the independence of the switching control system from the call processing system and in consequence enhances the capability to use the switching control system as a general service system for a plurality of user systems.

A further embodiment of the invention is characterized by a first group of central control processors in which one central control processor in each case comprises a transient system, a coordination system and a switching control system. This development also has a common information interface of the transient modules, which is designed as an interprocessor information interface.

In this embodiment, the capability to distribute the call chain over a plurality of central control processors achieves greater flexibility of the logic connection control and thus of the logic connection structures. In particular, the signaling interface system can in consequence form a part of the call processing system although, on a central control processor, it is in each case permanently assigned only to a specific portion of the physical accesses to the switching system.

A further embodiment of the invention is characterized by a second group of central control processors, in which one central control processor in each case comprises a specific steady-state module of the static system and that part of the data base which is relevant to this steady-state module.

The central administration of the resources by in each case one central control processor ensures that, from the point of view of distributed logic connection control, it is impossible for simultaneous multiple use of a resource administered by the transient system to occur.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
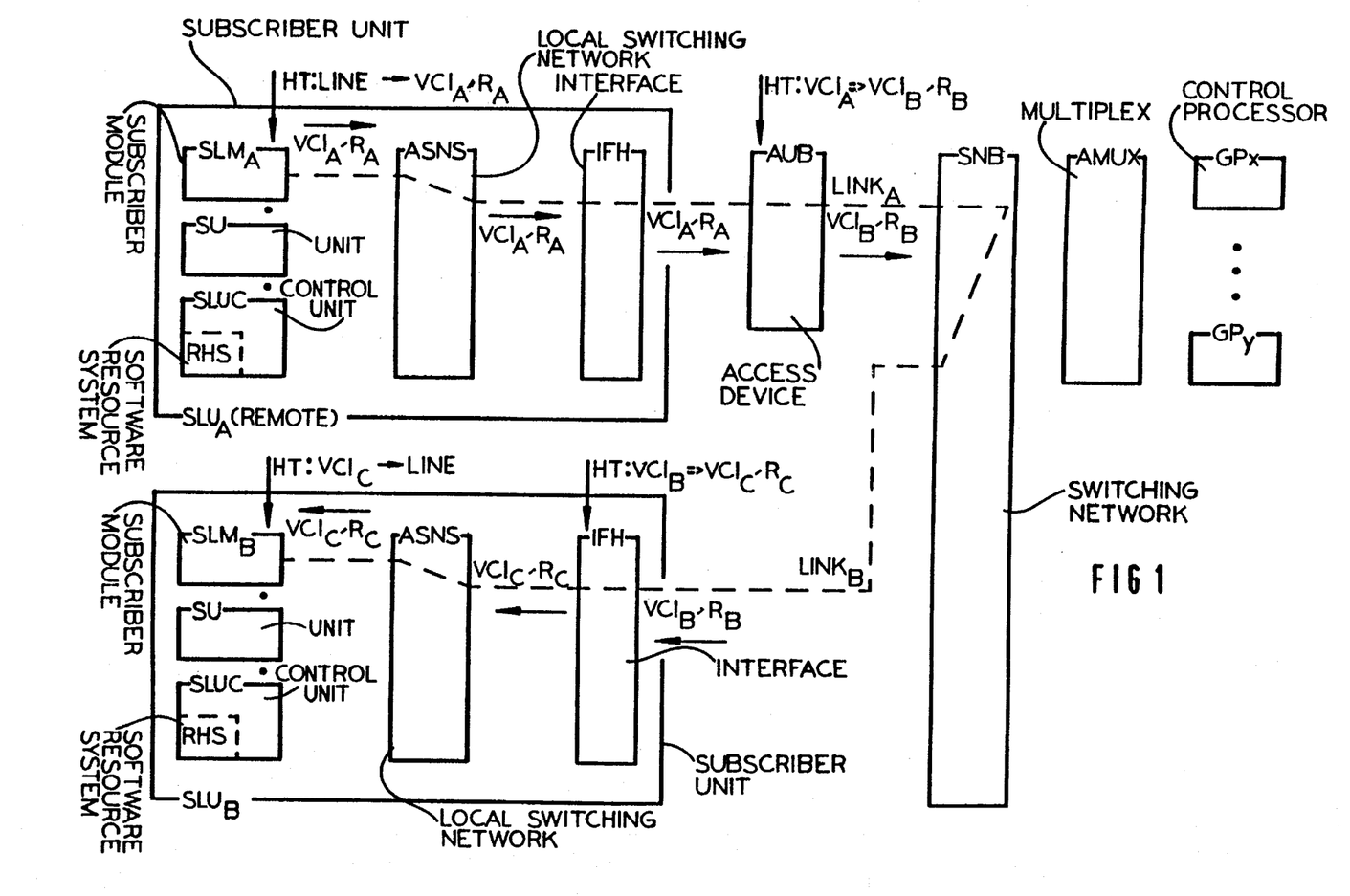
FIG. 1 shows the structure of an ATM switching system.

FIG. 1 shows the structure of an ATM switching system in which the software structure according to the invention can be used to implement the network layer.

The principles of the switching functions for setting up STM connections or ATM connections are comparable. Thus, for example, a virtual path through the relevant switching networks is also specified for an ATM connection before the actual data transfer starts. All the cells in an ATM connection are transferred via this path. In general, a plurality of connections will be involved in an ATM link. ATM cells which belong to the same connection are assigned the same VCI/VPI identifier (virtual connection/path identifier) in the cell header.

A selected path must be reserved in software lists for all links which produce a traffic concentration, in order to prevent an overload on the ATM links.

The number of cells which are transferred in a specific time interval defines the bandwidth which is occupied on a link by a specific ATM connection. The associated bandwidth is monitored in a connection-specific manner by a user/network interface in order to prevent the switching networks being flooded in an unauthorized manner by a specific user (policing). The said software directory is controlled by a software resource system RHS, which is implemented in a control unit SLUC of a subscriber unit SLU.

The VCI/VPI identifier which is assigned to a specific ATM connection and is abbreviated in FIG. 1 with the designation VCI is always valid for a specific link. Before the ATM cells are transferred onwards on another link, a new VCI/VPI identifier is entered in the header of an ATM cell (header translation HT). This header translation likewise takes place on the user/network interface which is not illustrated.

The header translation is additionally carried out in each case before passing through a switching network. In this case, a routing identifier R, which describes the specified path through the following switching network, is attached to an ATM cell at the same time as the entry of a new VCI/VPI identifier. The routing identifier R is evaluated within the following switching network in order to switch the cell through to the correct outgoing link. For a virtual path, only the VPI identifier is calculated again in the interface circuit IFH or in the access device AU (in the case of a remote SLU), while the VCI identifier, which is assigned to the individual connections, remains unchanged. All the cells having the same VPI identifier thus receive the same routing identifiers, which makes it possible for a plurality of virtual connections to be switched in a transparent manner over the same virtual path.

FIG. 1 shows the header translation for a virtual ATM connection via the main switching network SNB. A one-way connection from a subscriber line unit SLUA to a subscriber line unit SLUB is illustrated as the virtual ATM connection. The header translations carried out for one ATM cell are described in more detail in the following text.

The first header translation HT is carried out by the subscriber module SLMA. In this subscriber module, the routing identifiers RA for the path through the local switching network ASNS of the subscriber unit SLUA are attached to the ATM cells, and the VCIA identifier is entered in the header of the ATM cells.

The second header translation for the central switching network SNB is produced by the broadband access device AUB. In this broadband access device, all the incoming cells having the path identifier VCIA receive a new path identifier VCIB and a new routing identifier RB for the path through the main switching network SNB.

The third, and last, header translation is carried out in the subscriber unit SLUB at the B-end in the IFH. There, all the incoming cells having the path identifier VCIB receive a new path identifier VPIC, as well as new routing identifiers RC for the path through the local switching network ASNS of the subscriber unit SLUB.

Figure 2:
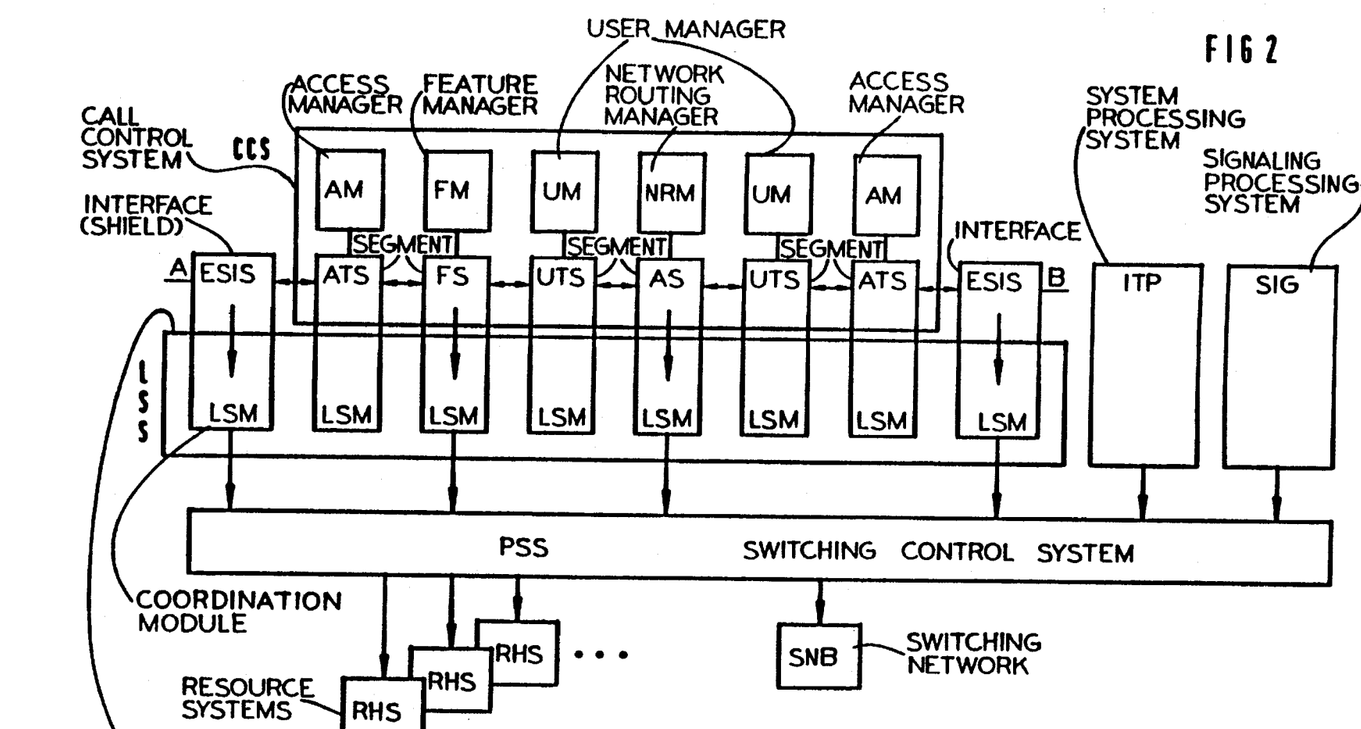
FIG. 2 shows the modular composition of the call processing system.

FIG. 2 shows the modular composition of a specific user system, namely the call processing system for controlling calls and its arrangement with respect to further software systems for controlling connections within a switching system.

The call processing system comprises a call control system CCS for controlling a connection at the logic level, an interface system ESIS for shielding the call control system from different signaling variants, and a coordination system LSS for coordination of the logic connection requests, which are produced by the call control system, with respect to a switching control system PSS. The interface system ESIS and the call control system can be combined as a specific connection system, namely they can be considered as or called a call connection system. The switching control system can be considered as the central controller of a resource control system.

Furthermore, a processing system ITP (system administration) and a processing system SIG (signaling administration) for controlling signaling connections of a signaling system are illustrated at the same level as the call processing system. In the same way as the call processing system, these processing systems contain connection systems which use the switching control system PSS to implement their logic connection wishes at the physical level.

FIG. 2 furthermore shows the decentralized part of the resource control system, namely resource systems RHS for local control of the resources of the switching system, and the main switching network SNB which is controlled directly by the switching control system, as the single resource of the switching system.

The following text describes the call processing system.

The ESIS produces the shielding of the call control system CCS from different signaling variants, by converting the different signaling schemes into a general information interface between the ESIS and CCS. The internal structure of the ESIS is strictly modular, with separate software modules for every supported signaling system and every variant of it. Corresponding entities are produced or removed by these software modules in conjunction with connections, depending on which connection-specific signaling requests occur. However, despite the different software modules, the call control system CCS always sees a general information interface to the ESIS.

In addition, the ESIS is responsible for the connection-related signaling interchange between different signaling systems.

The call control system CCS is used for controlling the connection at the logic level. Its tasks include traffic routing, standard connection setting up and clearing down, handling of performance features, informing the charge system and the statistical system of call events, etc. The area of the CCS tasks does not include the control of setting up and clearing down the physical connection. This is admittedly initialized by the CCS, but it is controlled autonomously by the switching control system PSS. Only those tasks of the CCS which relate to connection control are considered in more detail in the following text.

The CCS comprises two types of software units, namely steady-state modules (managers) and transient modules, which are designated call segments. The said call segments produce a series of entities (process entities or data entities) per connection, which entities communicate with one another via a common information interface. In the following text, the said entities are also designated segments, and the communicating series of entities is also designated a call chain.

The call segments include access segments ATS which represent the technical features of the relevant port, user segments UTS which represent the performance features of the user, associated segments AS which represent the association of the A-end and the B-end, and feature segments FS which represent non-standard features of a connection, that is to say individual features. The said call segments for a connection are produced or removed as a function of connection-specific requests and subscriber/network features.

The coordination system LSS coordinates connection requests which originate from different call segments and ESIS segments. For this purpose, the coordination system must buffer store the connection requests received from each segment. This is done in a coordination module LSM, which is assigned per segment. Every time a switching coordination module receives a new connection request from a segment, the status of the coordination module is evaluated and updated. A distributed control mechanism between the coordination modules ensures that the coordination system provides a consistent physical connection request with respect to the switching control system PSS.

The switching control system is described in the following text.

The switching control system is a basic service system for all the user systems of the switching system which request connections within the switching system. Apart from simple connection requests, the switching control system also deals with specific connection requests for the reconfiguration of connections which have been set up for the user systems.

The switching control system produces in each case one autonomous entity per connection request. In consequence, the interactions between the switching control system and the resource systems and main switching network are independent of the status of the entities of the respective user system.

The coordination system transforms the private view of a connection, which can be adapted to the segments (entities) of the call control system and of the signaling interface system, into a single consistent connection request with respect to the switching control system. For this reason, the switching control system may carry out connection orders from the coordination system in an unconditional manner. The only reasons for a negative acknowledgement to the coordination system are blocking conditions of the controllers of the switching networks (for example a negative acknowledgement from one of the resource systems RHS) or defects in the switching networks themselves (for example a negative acknowledgement from individual switching networks).

Every connection request to the switching control system causes a new transaction of the switching control system. Such a transaction comprises the control of the resource systems involved and thus the coordination of the setting up of a physical path through the switching networks of the switching system.

Since the actual resource handling (path resources and service unit resources) is separated from the switching control system and is carried out by resource systems independent of them, the switching control system does not require any assignment to a specific central control processor of the central control processors GPx, ... GPy (see FIG 1).

Furthermore, there is no limitation on having to use connection requests, which originate from the same call chain, on the same entity of the PSS. This allows very effective implementation of the functions of the switching control system within the hardware system. Every central control processor can thus operate a plurality of entities of the switching control system in parallel. In consequence, a user system can always submit its connection requests to a switching control system of its own central control processor. Since the switching control system waits for confirmations of the resource systems and/or of the main switching network, it is possible to carry out parallel execution of connection requests for different connections on in each case one single central control processor. For this purpose, one specific particularizing mechanism must be made available per central control processor (for example process particularizing or data particularizing).

Resources which are assigned to a connection must be stored in a connection-specific manner for the duration of a connection in order to be able to clear down the connection at the end. If these data were stored in the switching control system, it would have to be of considerably more complex construction. For example, a PSS entity would in each case have to be given for the entire duration of the connection, which would necessitate an additional state/event coupling within the PSS and, furthermore, new checks for consistency of the connection requests between the PSS and the user systems. In order to avoid this increased complexity, the connection data are stored within the respective user system. For example, the connection data for the call processing system are stored in data fields assigned to the coordination system. In order to implement this concept, a so-called "path envelope" is passed backwards and forwards between the user system and the switching control system, which path envelope the current connection data (path data and other resource data) contain. While the path envelope for the user system is a black box, the contents of this path envelope are evaluated by the switching control system in order to carry out an optimum path search for the connection requests.

In summary, the switching control system thus represents an interface between the call processing system and the resource systems and/or the main switching network, which interface allows the call processing system to submit combined connection requests, which contain a resource operation and switching, in a single connection request to the switching control system. In this context, the switching control system ensures that the combined connection request is carried out in a coordinated manner.

The call control system is described in more detail in the following text.

As already mentioned, the call control system comprises two types of software units, namely steady-state units (managers) and transient units (segments).

Steady-state managers mainly control long-life call processing entities, for example a telephone number of a subscriber or the type of a port. There is in each case one steady-state manager per entity, which forms a neutral interface between the call processing and the steady-state data base. Steady-state managers thus shield the connection controller from the structure of the physical data base. In addition they carry out functions related to the respective entity, such as busy/idle handling operations. In order to achieve efficiency in real time, steady-state managers are located physically close to the data controlled by them and can thus be contained within a software capsule of the physical data base. Steady-state managers furthermore identify all the active transient segments (entities) to which they are currently making their services available, and supply these active transient segments, as a response, with data in a format which is defined for call processing.

Transient segments control short-life entities, for example a standard connection or a performance feature. Transient segments are produced or destroyed on the basis of user/network actions such as "going off hook" or "placing down", and carry out logic call control functions, such as operations for making a port busy or releasing it and carrying out specific actions for a performance feature. At the start of a connection, the transient segments are produced and are used at their respectively associated steady-state managers in order to obtain the data required by them from the data base. The transient segments store the data received and work with these data throughout the entire duration of a connection. At the end of a connection, the transient segments are destroyed, and the transient data controlled by them are thus also destroyed.

The individual types of steady-state manager are described in more detail in the following text:

An access manager AM represents a physical subscriber/network access which is independent of the signaling type and is defined by a logic access identifier. This manager identifies the resources (channels, bandwidth and terminals) associated with a specific physical access, as well as blocking conditions and logic user identifiers associated with this physical access. In addition, an access manager carries out the access-related free/busy handling operation and assigns the access resources required for this purpose (for example assignment of a VPI/VCI number).

Finally, an access manager must in each case define, for the transient segments operated by it, the link to the entities required by the next transient segment. In the case of an A-connection end, "define a link" for the access manager means the definition of a logic user identifier. This requires either checking a logic user identifier supplied by the user himself or determining a logic user identifier assigned to the present physical access (for example in the case of an analog user). In the case of a B-connection end, the definition of a link means, for the access manager, the definition of the logic signaling type identifier. This is determined on the basis of the logic access identifier and, possibly, predetermined terminals.

A user manager UM represents a subscriber (user) who is defined by a logic user identifier (for example a telephone number). This manager identifies the limits, provided for the specific user, for the request on the basis of resources, administrative blocking conditions and features of the user. The user manager is responsible for all the standard call processing functions which are related to the said user-related data. The user manager also carries out the user-related free/busy handling operation and assigns requested user resources. Finally, in the case of a user at the B-connection end, the user manager defines the logic access identification which forms the link to the entities of the next transient segment (ATS segment).

A feature manager FM is required for individual features. It controls feature-related data which are associated with the subscriber or the group which has subscribed to this performance feature. The feature manager results in the feature data being separated from the normal subscriber data, so that an extension to or a change of the performance features does not necessarily exert any influence on the standard call processing.

A trunk group manager TGM controls a logic trunk group. It carries out trunk selection at the outgoing connection end and marks a channel of the trunk group at the incoming connection end as busy. Furthermore, it supplies trunk-group-related data to a trunk group segment TGS.

A network routing manager NRM evaluates the received information (for example dialed digits) with the aid of a translator, and defines a suitable connection handling operation. The NRM can control a plurality of translators (for example POTS, CENTREX, packet etc.), which can be added and controlled in accordance with the wishes of the customers. The neutral interface between call segments and the network routing manager shields the call segments from the specific architecture of the translators.

The individual types of transient segments are described in more detail in the following text. An access segment ATS represents the control of access-related transactions. It produces an autonomous request on the basis of access resources, for example from each SETUP information item. Access resources may comprise an individual B-channel or D-channel of a subscriber, an individual connection line (trunk) or an associated bandwidth having a plurality of channels. The ATS additionally controls the triggering of appropriate feature segments FS for controlling access-related features.

A user segment UTS represents the control of user-related transactions. In this case, it in each case produces an individual request in accordance with user resources. The UTS additionally controls the triggering of user features.

A trunk group segment TGS controls the involvement of a trunk of a trunk group in a connection. The TGS segment in this case requires that the TGM manager carry out the selection of a trunk at the outgoing connection end, and informs it that the trunk at the incoming connection end is busy.

An associated segment AS associates a connection pair at the A-end and B-end. At the same time, it coordinates the setting up and clearing down of a connection and initiates the translation/routing activities by the NRM manager.

A feature segment FS controls the handling of subscriber-specific performance features. FS segments are inserted into an already existing call chain, if they are requested by a subscriber or by the network. Every FS segment contains feature-related logic and has access to feature-related data in the data base. The feature-related logic is thus centralized, by the FS segment, in a single software unit. Advanced intelligent network services are supported, for example, by an FS segment in that it forms an interface to a service control point (SCP). In principle, an FS segment can be inserted into the call chain between an ESIS segment and an ATS segment, an ATS segment and a UTS segment, or a UTS segment and an AS segment. This depends on factors such as the relevant trigger point and resource-related requests.

The sequence during the setting up of a connection for a standard call is described in the following text.

The subscriber line module of a subscriber A initially detects a busy information item and then sends a SETUP information item to the group processor GP associated with it, at which point an ESIS segment is produced in order to receive this information item. The ESIS segment converts the received SETUP information item into a general SETUP information item for the call control system, requests an ATS segment and passes the general SETUP information item to the ATS.

The access segment ATS then requests access-related data from its access manager AM. The AM reads access-related data from the access data base, carries out an access-related busy/free handling operation, and, finally, passes the requested access-related data to the ATS. The ATS stores the access-related data, requests a UTS, and passes the SETUP information item to the UTS produced.

The UTS requests user-related data from its UM manager. The UM reads the requested data from the user data base, carries out a user-related busy/free handling operation, and passes the requested user-related data to the UTS. The UTS then requests an AS which, for its part, in turn requests dialed digits. The request for dialed digits is sent via an information item which the call chain [lacuna] from the AS inter alia to the ESIS at the A-end. At this point in time, the call chain at the A-end comprises ESIS-ATS-UTS-AS.

The ESIS now uses the type of signaling system to determine whether a dialing tone or a code receiver is required, and informs the switching control system PSS via the coordination system LSS. The PSS defines the optimum resource configuration and then requests an assignment and connection of the selected resources by the corresponding resource system RHS. The RHS stores the selection of physical resources and then controls the switching through of the selected resources. When the code receiver receives dialed digits, it sends them directly to the associated ESIS.

The ESIS then produces a request to the coordination system LSS for the dialing tone to be turned off, converts the dialed digits to a standard representation, and the call chain then sends them to the AS segment.

The dialed digits in this case flow via the ATS segment and the UTS segment and are finally received by the AS segment. The AS sends the dialed digits to the NRM manager, which allows the dialed digits to be subjected to the necessary translation by the translator. As soon as the translation result is fixed, the NRM manager passes the result back to the AS segment, which then causes a UTS segment to be produced at the B-end.

Once the end of the dialing process has been identified, the ESIS segment at the A-end causes the code receiver to be switched off by means of a corresponding request to the switching control system PSS via the coordination system LSS. The switching control system PSS then commands the resource system RHS, which turns off and releases the said physical resource, namely the code receiver, again.

The UTS segment at the B-end now requests data from its user manager UM, which then checks the busy counter of the telephone number, and increments it. The UTS segment at the B-end then requests an ATS segment. The ATS segment then requests data from its access manager AM, which then checks the access-related busy/free status, and makes the access busy.

The ATS segment then requests an ESIS segment, which then passes the order to make it busy to the subscriber line module of the subscriber B, and sends the data required for this purpose. The subscriber line module then applies the calling current. The ESIS segment at the B-end now requests that the ringing tone be switched on by the coordination system LSS, which then emits an appropriate request to the switching control system PSS. The PSS determines the physical path through the switching networks affected by the call, and then requests the resource system RHS to assign and switch through the ringing tone.

The physical path in the rearward direction is switched through at this point in time. The ringing tone at the A-subscriber end is thus supplied via the subscriber line module SLMB.

When the B-subscriber goes off hook, this is identified by the subscriber line module assigned to him. The subscriber line module then turns the dialing current off and sends an OFF-HOOK information item to the ESIS segment of the group processor GP assigned to it.

The ESIS segment then requests that the ringing tone be turned off, passes a CONNECT information item on through the call chain to the AS segment and in consequence causes the voice path to be set up in the forward direction. Communication via the voice paths can now take place.

The coordination system LSS according to FIG. 2 is described in more detail in the following text.

As already mentioned, the coordination system coordinates connection requests which originate from different segments. For this purpose, it stores the connection requests received from the different segments. In each case one coordination module LSM is provided for the storage of a connection request of one segment. Every time a new connection request is received from a segment, the status of these coordination modules is evaluated and updated. The control mechanism between the coordination modules ensures that the coordination system LSS always transfers a single, consistent switching command to the switching control system PSS.

In order to reduce any dynamic additional complexity for the communications requirement of the coordination system (internally between the coordination modules and externally between the coordination modules and the segments), the coordination system is strongly linked to the ESIS/CCS system. A coordination module is preferably in each case linked to a segment so firmly that connection requests from the segments to the coordination system or to the coordination modules represent local procedure calls.

Furthermore, the information between the segments is used in order to transmit coordination information between the coordination modules. This is worthwhile particularly when setting up a connection. Specifically, the setting up of a connection is particularly communications-intensive for the coordination system, since the receiver and tones must be turned on and off. Since the information flow between the coordination modules actually runs in parallel with the information flow of the segments, no additional increased complexity with respect to the communication of the call processing system is incurred if information between the coordination modules is embedded in information for communication between the segments.

Although the coordination system is thus very strongly linked to the ESIS/CCS system, a clear distinction nevertheless remains between the coordination system and the ESIS/CCS system, namely a well-defined procedure interface.

Apart from coordination of the connection requests of segments, the coordination system is also used for translating the connection requests into switching commands for the switching control system. The segments can thus be limited to a very abstract description in the formulation of their connection requests (abstract view of a connection), which regards the entire switching network as a black box.

Figure 3:
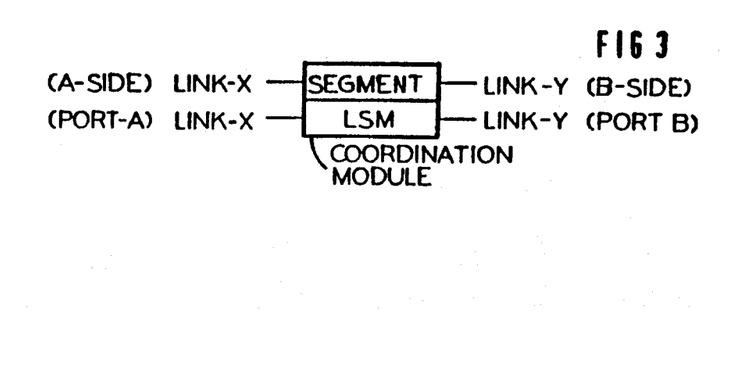
FIG. 3 shows the view of the segments of the connection system and of the coordination modules of the coordination system with respect to a connection.

The view of the segments and the coordination modules with respect to a connection is explained in more detail in the following text, with reference to FIG. 3.

Most segments have two links, namely link-X and link-Y. Segments for special performance features may, however, also have more than two links, for example the segment for implementing three-way calling has three directly adjacent segments in the call chain and thus three links. The segments in each case associate a specific connection end with each of their links. This association is defined by appropriate assignment in the production of the segment. According to this view, a segment always formulates a connection request with the aid of its logic links, for example "connect link-X to link-Y" or "connect link-X to an announcement".

A coordination module LSM which is permanently assigned to a specific segment has the same data fields as the associated segment for buffer storage of a connection request. A coordination module thus identifies the same links as its associated segment. In contrast to the segment, these links are, however, associated with the port address in the view of a coordination module.

For an ATM switching network, the connection end point assigned to a subscriber or to a connecting line means a VCI/VPI number. As already mentioned, for a coordination module, the connection end point means a VPI/VCI number at a specific port. The port address (including the busy VPI/VCI number) of a connection end point of the call chain is controlled by the access manager AM and is passed via the call chain to the appropriate coordination modules whenever an outgoing request from an active connection end point is identified.

For simplicity, a connection end point is designated a "port" in the following text, without having to mention the associated VPI/VCI number explicitly.

The connection view of a coordination module comprises, in addition to the port address and the VPI/VCI number, the type of port affected as well (in this case, port can be understood to be in the sense of a connection end point). If a resource (passive port) is intended to be connected to a specific link, the type of resource is also indicated (for example announcement, broadcast tone, jumper) by the connection request of a segment. The actions of the coordination system for a received connection request from a specific segment depend on the connection status and the associated port types. The said status is in this case formed by the totality of the statuses stored in the coordination modules. Communication between the coordination modules is therefore possibly required in order to carry out a connection request. Examples of port types are: "active port" for ports which are assigned to a subscriber or to a connecting line, "announcement port", "jumper port", and "0 port" for no connections.

The internal control mechanism of the coordination system is described in the following text.

Stimulation signals from active ports which are associated with subscribers or connecting lines must be coordinated. For a standard call, there are two and only two active ports which are assigned to the A-end and B-end of the standard connection. In order to coordinate a stimulation signal from an active port, or to put it more precisely the connection request derived therefrom, a control mechanism is used. According to this control mechanism, the control over an active port is always assigned at a specific point in time to one and only one coordination module of the coordination system. If a coordination module has the said control over a port, it can send connection requests for this port to the switching control system PSS.

If a segment submits a connection request for a port over which its coordination module assigned to it has no control at this point in time, there are three alternatives: 1st alternative: the coordination module is authorized to request control over the port (connection end point) from another coordination module, 2nd alternative: the coordination module must wait until another coordination module releases control over the port, 3rd alternative: the coordination module is authorized to transfer the request to another coordination module which can achieve control over the port.

The selection of one of the said alternatives is carried out in accordance with priority rules which correspond with the priority rules for the segments of the ESIS/CCS system. In the case of the ESIS/CCS system, segments which are located closer to the signaling source (active port) have priority for signals which originate at their connection end. In an analogous manner to this, in the case of the coordination system LSS, those coordination modules which are located closest to the signaling source within the call chain have the highest priority for control of the active port at their connection end. This means that connection requests from segments which are located further away and are thus prioritized lower are made subordinate to those which are located closer to the active port. Connection requests which have been made subordinate are stored in the coordination module of the requesting segment, and become active as soon as the segment prioritized higher releases control over the active port.

In the case of the call control system CCS, the AS segment plays a central role as a linking element between segments at the A-end and the B-end. This central role is also maintained for the AS coordination module. The AS coordination module is the only coordination module which can achieve control over the port at the A-end and at the B-end. All the other coordination modules can achieve control only over the port located at their connection end.

Since the AS coordination module is the only coordination module which can simultaneously achieve control over the A-end and over the B-end, it is also the only coordination module which can transfer a switching command to the switching control system PSS which produces through-switching between the A-end and the B-end.

As a result of the central role of the AS coordination module, it becomes possible to limit the communication between the coordination modules to half of the call chain, the coordination of the two halves being managed by the AS coordination module. While a normal coordination module can never achieve control over an active port which is located on the other side of the AS coordination module, the segment which is associated with this coordination module can nevertheless send a connection request to the remote connection end. These remote connection requests must be transferred to the AS coordination module which can finally pass on the respective connection request to the switching control system as soon as it has achieved control over the ports involved.

The said priority rules apply in a corresponding manner to a port of a remote connection end. A coordination module which is located closest to the remote connection end point is prioritized above the coordination modules located more remotely from the connection end point.

The explained control mechanism for connection requests to the coordination system is implemented by means of the internal structure of the data and the logic of the coordination system. In order to achieve effective coordination within the coordination system, the status information items contained in a coordination module, apart from the private connection data, also comprise information on the location in the call chain which currently has control over an involved connection end point. This information is updated whenever the said control is transferred to another coordination module. Connection requests to a coordination module originate either from a segment or from another coordination module.

Figure 4:
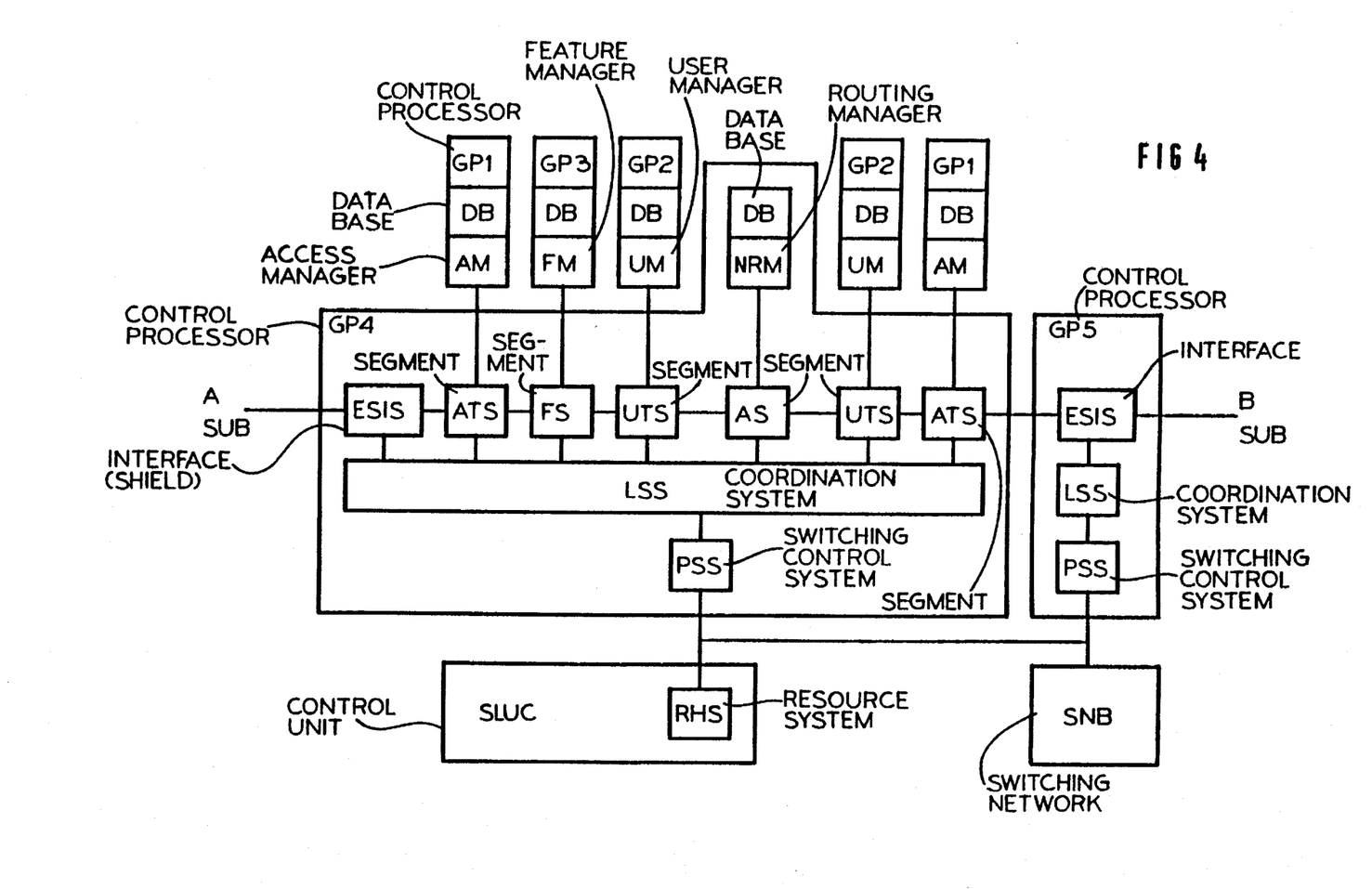
FIG. 4 shows the distribution of the software systems for controlling connections to the hardware systems.

FIG. 4 shows the distribution of those software systems which are related to a connection control between central control processors GP1, . . . , GP5 and local control processors SLUC. Among the central control processors there is a first group of central control processors which in each case comprise a transient system, a coordination system LSS and a switching control system PSS. In FIG. 4, this first group of central control processors is represented by the control processors GP4 and GP5. In addition, such a control processor of the first group comprises a routing manager NRM and that part of the data base DB controlled by it. This situation is illustrated in FIG. 4 for the central control processor GP4.

Among the central control processors there is furthermore a second group of control processors, which each comprise a steady-state module (manager AM, FM and UM) and that part of the data base DB which is associated with it and corresponds in FIG. 4 to the central control processors GP1, GP2 and GP3.

The information interface which is common to all the modules is designed as an interprocessor information interface and thus makes it possible to distribute a call chain over a plurality of control processors. FIG. 4 shows the distribution of the call chain over central control processors during a standard call. The illustrated distribution minimizes the outlay for communication between the transient modules in that the overall call chain is as far as possible distributed on one central control processor. Since the signaling interface system ESIS is in each case permanently assigned to a specific portion of the physical accesses, and the physical access for the subscriber B in FIG. 4 is assigned to the signaling interface system of the central control processor GP5, the call chain can, however, not remain completely limited to one central control processor. In other respects, the distribution of the call chain also depends on the complexity of the logic connection structure of a call, that is to say on the features involved. The resource system RHS is in each case located on a local control processor SLUC of a decentralized subscriber unit SLU, to be precise to the same extent for internal and external subscriber units.

The steady-state modules (managers) are closely linked to that part of the data base DB controlled by them, and they are therefore in each case located on the same central control processor. With the exception of the steady-state module NRM, all the other steady-state modules are in each case located on a separate central control processor.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A call processing system for controlling connections in a switching system, comprising:
   a) a signaling interface system which forms an interface of the call processing system to a signaling type on which respective connection ends are based, and which carries out a part of logic connection control which is dependent on the signaling type;
   b) a call control system which carries out a part of the logic connection control which is independent of the signaling type;
   c) a resource control system which initializes connection control processes at a physical level by corresponding to connection requests which connection requests are produced by the signaling interface system and the call control system in a mutually independent manner; and
   d) a coordination system which coordinates the mutually independent connection requests submitted to the resource control system by the signaling interface system and the call control system.

2. The call processing system as claimed in claim 1, wherein the call control system and the signaling interface system comprise a transient system having a plurality of transient modules,
   a) the transient modules dynamically producing in each case one chain of entities per connection, which entities communicate with one another by means of an information interface which is common to all the transient modules, and
   b) an entity in each case autonomously carrying out a sub task of the logic connection control and in so doing, being able to submit corresponding autonomous connection requests to the resource control system, via the coordination system.

3. The call processing system as claimed in claim 2, wherein:
   a) stimulation information which causes user actions is in each case initially received by entities at ends of a respective chain and, after carrying out a sub task corresponding to a respective entity, can be passed on along the chain; and
   b) the position of an entity in the respective chain is defined by a function of its transient module.

4. The call processing system as claimed in claim 2, wherein the call control system additionally comprises a static system having a plurality of steady-state modules, a steady-state module receiving commands from the produced entities of a transient module and then carrying out a part of the control task of a transient module which is dependent on a structure of a data base.

5. The call processing system as claimed in claim 1, wherein the coordination system comprises coordination modules,
   a) which receive and buffer store connection requests produced for an active connection end point involved with a connection,
   b) which pass onto the resource control system a connection request buffer stored by them when they have received control over an active connection end point,
   c) which give up control over a specific active connection end point between one another in such a manner that only one coordination module has control over this active connection end point at a specific point in time.

6. A switching system, comprising:
   a call processing system having;
      a signaling interface system which forms an interface of the call processing system to a signaling type on which respective connection ends are based, and which carries out a part of logic connection control which is dependent on the signaling type,
      a call control system which carries out a part of the logic connection control which is independent of the signaling type,
      a resource control system which initializes connection control processes at a physical level by corresponding to connection requests, which connection requests are produced by the signaling interface system and the call control system in a mutually independent manner, and
      a coordination system which coordinates the mutually independent connection requests submitted to the resource control system by the signaling interface system and the call control system;
   the resource control system having a switching control system and resource systems,
   the switching control system controlling the connections at the physical level in a central manner and for this purpose receiving connection requests from the call processing system, while
   the resource systems of the switching system control respective resources locally and for this purpose receive commands from the switching control system.

7. The switching system as claimed in claim 6, wherein
   a) the switching control system processes, independently of one another, the connection requests received from the call processing system,
   b) in the case of first connection requests, the switching control system sets up a path envelope which includes data describing a switched path,
   c) the switching control system transfers said path envelope to the coordination system after carrying out the connection request,
   d) the coordination system stores the path envelope and also passes the path envelope to the switching control system in the case of a later connection request.

8. The switching system as claimed in claim 6, wherein the switching system further comprises:
   a) a first group of central control processors in which one central control processor in each case comprises a transient system, a coordination system and a switching control system;
   b) said transient system having a plurality of transient modules, the transient modules dynamically producing in each case one chain of entities per connection, which entities communicate with one another by means of an information interface which is common to all the transient modules, and an entity in each case autonomously carrying out a sub task of the logic connection conrol and in so doing, being able to submit corresponding autonomous connection requests to the resource control system, via the coordination system;
   c) a common information interface of the transient modules, which is an interprocessor information interface.

9. The switching system as claimed in claim 8, wherein the switching system further comprises:
   a static system having a plurality of steady-state modules, a steady-state module receiving commands from the produced entities of a transient module and then carrying out a part of the control task of a transient module which is dependent on a structure of a data base; and
   a second group of central control processors, in which one central control processor in each case has a specific steady-state module of the static system and that part of the data base which is relevant to this steady-state module.

* * * * *